US008769556B2

(12) United States Patent
Guo et al.

(10) Patent No.: US 8,769,556 B2
(45) Date of Patent: Jul. 1, 2014

(54) TARGETED ADVERTISEMENT BASED ON FACE CLUSTERING FOR TIME-VARYING VIDEO

(75) Inventors: Feng Guo, San Diego, CA (US);
Himanshu Arora, Sunnyvale, CA (US);
Boaz J. Super, Westchester, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/284,282

(22) Filed: Oct. 28, 2011

(65) Prior Publication Data

US 2013/0111509 A1 May 2, 2013

(51) Int. Cl.
*H04H 60/45* (2008.01)
*H04N 21/442* (2011.01)
*H04N 21/81* (2011.01)
*H04H 60/65* (2008.01)
*H04N 21/4223* (2011.01)
*G06K 9/00* (2006.01)
*G06K 9/62* (2006.01)

(52) U.S. Cl.
CPC ... *H04N 21/44218* (2013.01); *H04N 21/44222* (2013.01); *G06K 9/6221* (2013.01); *H04N 21/812* (2013.01); *H04H 60/65* (2013.01); *H04H 60/45* (2013.01); *H04N 21/4223* (2013.01); *G06K 9/00677* (2013.01)
USPC ............... 725/10; 725/12; 382/118; 382/225

(58) Field of Classification Search
CPC ................. H04N 21/44218; H04N 21/44222; H04H 60/45
USPC ............... 725/9–13; 348/169–172, 262, 335, 348/340–344, 359–361, 372–376, 207, 348/215.1–220.1; 209/569, 583–584; 382/100–154, 162–172, 181, 187–189, 382/251–253, 318–319, 325, 225; 434/116
See application file for complete search history.

(56) References Cited

U.S. PATENT DOCUMENTS 7,375,731 B2 * 5/2008 Divakaran et al. ............ 345/581
7,606,425 B2 * 10/2009 Bazakos et al. ............... 382/224
8,208,694 B2 * 6/2012 Jelonek et al. ................ 382/118
2002/0184098 A1 * 12/2002 Giraud et al. .................. 705/14

(Continued)

FOREIGN PATENT DOCUMENTS

WO        0232136 A2      4/2002
WO     WO 0232136 A2 *    4/2002
WO     2008045521 A2      4/2008

OTHER PUBLICATIONS

International Search Report and Written Opinion for related counterpart International Patent Application No. PCT/US20112/059536 mailed on Dec. 20, 2012.

(Continued)

*Primary Examiner* — Nasser Goodarzi
*Assistant Examiner* — Michael B Pierorazio
(74) *Attorney, Agent, or Firm* — Kenneth A. Haas

(57) ABSTRACT

A method and apparatus for providing targeted advertisements is provided herein. In particular, targeted advertisements are provided to users based on face clustering for time-varying video. During operation video is continuously obtained of users of the system. Users' faces are detected and measured. Measurements of users' faces are then clustered. Once the clusters are available, advertisements are targeted at clusters rather than individual users.

17 Claims, 4 Drawing Sheets

High level description: clustering and learning correlations

(56) References Cited

U.S. PATENT DOCUMENTS

| | | | |
|---|---|---|---|
| 2002/0186867 A1* | 12/2002 | Gutta et al. | 382/116 |
| 2005/0080671 A1* | 4/2005 | Giraud et al. | 705/14 |
| 2006/0053342 A1* | 3/2006 | Bazakos et al. | 714/37 |
| 2008/0002892 A1* | 1/2008 | Jelonek et al. | 382/224 |
| 2009/0116695 A1* | 5/2009 | Anchyshkin et al. | 382/106 |
| 2009/0133051 A1* | 5/2009 | Hildreth | 725/28 |
| 2009/0196464 A1* | 8/2009 | Dimitrova et al. | 382/118 |
| 2009/0210902 A1* | 8/2009 | Slaney et al. | 725/34 |
| 2009/0217315 A1* | 8/2009 | Malik et al. | 725/9 |
| 2009/0285454 A1* | 11/2009 | Xu | 382/118 |
| 2010/0007726 A1* | 1/2010 | Barbieri et al. | 348/78 |
| 2010/0008547 A1* | 1/2010 | Yagnik et al. | 382/118 |
| 2010/0067745 A1* | 3/2010 | Kovtun et al. | 382/106 |
| 2010/0141787 A1* | 6/2010 | Bigioi et al. | 348/222.1 |
| 2010/0299210 A1* | 11/2010 | Giraud et al. | 705/14.66 |
| 2011/0052012 A1* | 3/2011 | Bambha et al. | 382/118 |
| 2011/0129126 A1* | 6/2011 | Begeja et al. | 382/118 |
| 2011/0150295 A1* | 6/2011 | Eckhoff et al. | 382/118 |
| 2011/0150296 A1* | 6/2011 | Eckhoff et al. | 382/118 |
| 2011/0150297 A1* | 6/2011 | Eckhoff et al. | 382/118 |
| 2011/0150298 A1* | 6/2011 | Eckhoff et al. | 382/118 |
| 2011/0150299 A1* | 6/2011 | Eckhoff et al. | 382/118 |
| 2011/0231757 A1* | 9/2011 | Haddick et al. | 715/702 |
| 2012/0072936 A1* | 3/2012 | Small et al. | 725/10 |
| 2013/0036011 A1* | 2/2013 | Roberts et al. | 705/14.58 |

OTHER PUBLICATIONS

Srinivas Gutta et al.: "Mixture of Experts for Classification of Gender, Ethnic Origin, and Pose of Human Faces", IEEE Transactions on Meural Networks, IEEE Service Center, Picataway, NJ, vol. 11, No. 4, Jul. 1, 2000, XP011039496, ISSN1045-9227.

Stefan Eickeler, et al. "Video Indexing Using Face Detection and Face Recognition Methods", 2008; 4 Pages.

Bisser Raytchev, et al. "Unsupervised Face Recognition by Associative Chaining", Jul. 27, 2001; 13 Pages.

"Add name tags in Picasa," Picasa, accessed at http://support.google.com/picasa/answer/156272?&, Sep. 27, 2011, pp. 4.

* cited by examiner

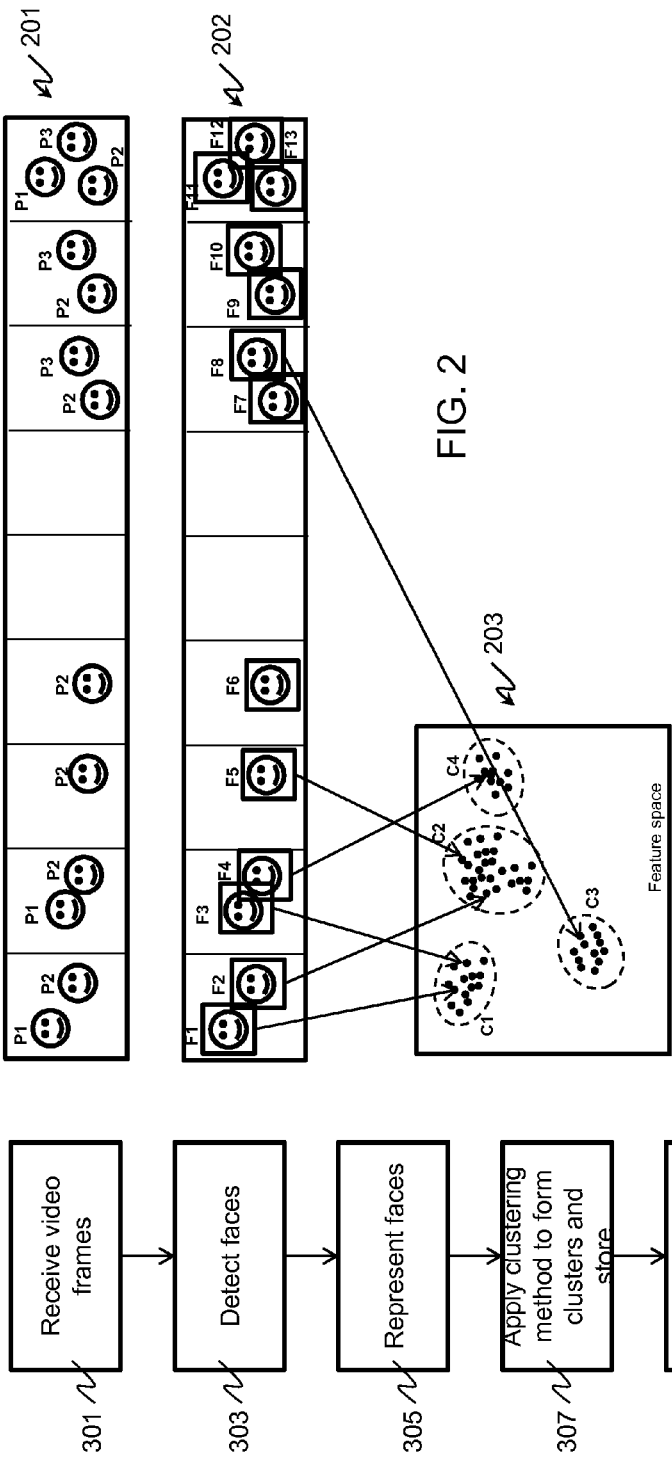

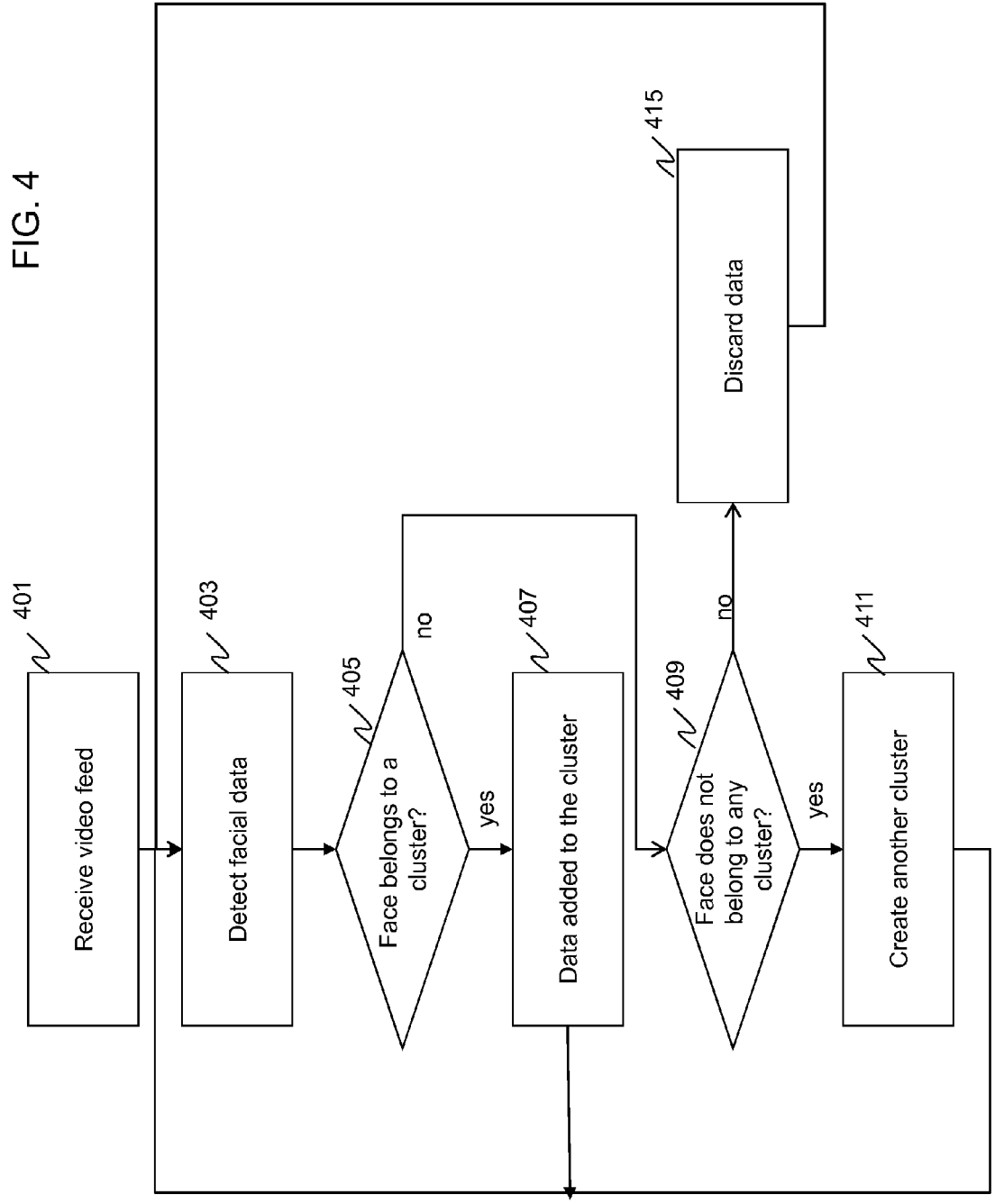

TARGETED ADVERTISEMENT BASED ON FACE CLUSTERING FOR TIME-VARYING VIDEO

FIELD OF THE INVENTION

The present invention generally relates to facial recognition, and more particularly to targeted advertisement based on face clustering for time-varying video.

BACKGROUND OF THE INVENTION

Targeted advertisement insertion is an effective way to handle linear television advertisements. In such a system, targeted advertisements are provided to users and inserted in linear television content. In a client based Advanced Advertising solution, advertisements for linear television content are downloaded from a central server and displayed to the end user based on various targeting criteria, potentially overriding existing advertisement content and/or at other positions during the linear television program. Such systems include, but are not limited to the Society of Cable Engineers (SCTE) 130 (SCTE-130) for signaling advertising information, SCTE-35 for in-band advertisement marker identification and Cable Labs ADI 3.0 for out-of-band advertisement marker identification (NPT signaling).

When advertisements are targeted for a particular user, a problem exists in identifying the particular user. One possible technique to identify a user is to install a camera on a set-top-box which aids in identifying the user. In such an application, prior knowledge of a number of individuals using the television is typically unknown. Thus, the number of users to be identified is not fixed and known in advance. Additionally, the system must be open for new users at any time. Therefore a need exists for a method and apparatus for providing targeted advertisements to users that does not require prior knowledge of users of the system and is open for new users at any time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 illustrates facial clustering.

FIG. 3 shows those steps taken by a set-top box in creating clusters and associating certain information (e.g., advertisements) to the clusters.

FIG. 4 illustrates dynamically updating clusters over time.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus for providing targeted advertisements is provided herein. In particular, targeted advertisements are provided to users based on face clustering for time-varying video. During operation video is continuously obtained of users of the system. Users' faces are detected and measured. Measurements of users' faces are then clustered. Once the clusters are available, advertisements are targeted at clusters rather than individual users.

Ideally, there exists one cluster per user and one user per cluster. In practice, there may be multiple clusters per user, and sometimes multiple individuals might be merged in a single cluster. Regardless of this fact, once the clusters are available, advertisements are targeted at clusters rather than individual users.

Because advertisements are provided to a user or group of users based on their association with a particular set or sets of clusters, prior knowledge of a number of individuals using the television does not need to be known. Additionally, the system is open for new users at any time since the system can generate new clusters corresponding to new users over time. Furthermore, the system can adapt over time to existing users as their appearance changes since the system can adaptively update clusters over time.

Figure 1:
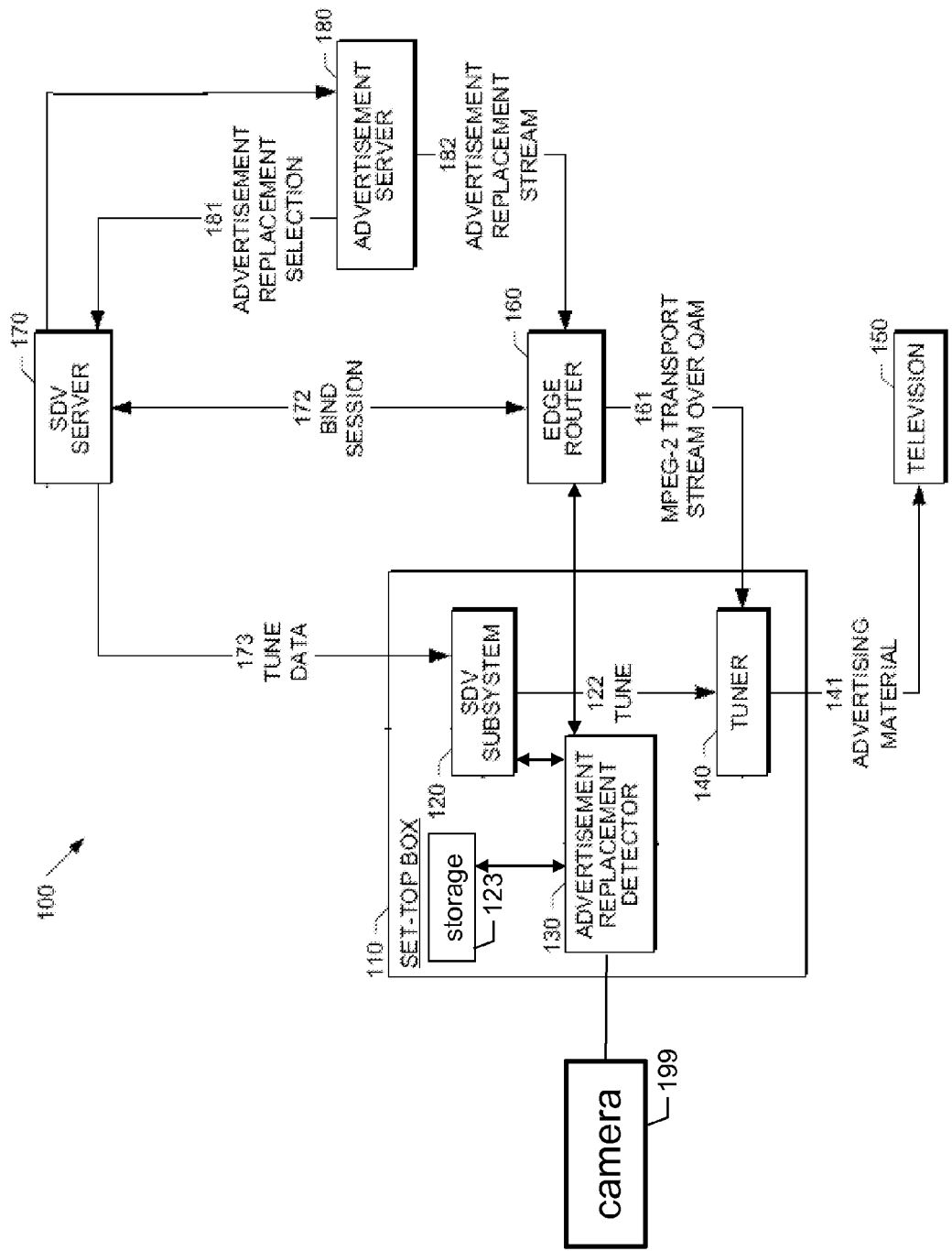
FIG. 1 is a block diagram illustrating a general operational environment, according to one embodiment of the present invention.

Turning now to the drawings, where like numerals designate like components, FIG. 1 is a block diagram showing hardware components of a switched digital video (SDV) system 100. SDV system 100 includes set-top box 110, television 150, edge router 160, SDV server 170, and advertisement server 180. In one embodiment, a network (not shown), such as a hybrid-fiber coaxial (HFC) network, connects the set-top box 110 and the television 150 to the edge router 160, SDV server 170, and the advertisement server 180. In another embodiment, a network (not shown) connects the advertisement server 180 to the edge router 160 and SDV server 170.

Set-top box 110 is a computing device that connects television 150 and an external signal source, turning the signal into a content stream that television 150 displays. Set-top box 110 shown in FIG. 1 includes an SDV subsystem 120, advertisement replacement detector 130, tuner 140, and internal storage 123. Internal storage 123 preferably comprises storage such as, but not limited to a Serial ATA (SATA) hard disk drive, optical drive, Small Computer System Interface (SCSI) disk, flash memory, or the like, and is used to store advertisements.

The edge router 160 is a computing device that transfers data between a local area network and a wide area network, choosing the most effective paths to use when sending or receiving data. The edge router 160 shown in FIG. 1 includes quadrature amplitude modulators (QAMs) that enable the transmission of a multiplex of digital streams via a radio-frequency (RF) carrier.

SDV server 170 is a computing device that receives channel change requests for switched content from the set-top box 110, binds that content to a session on the edge router 160 that is associated with a QAM feeding the service group for the set-top box 110, and responds to the set-top box 110 with the frequency and program number where the content may be found.

The system shown in FIG. 1 utilizes an SDV environment to send a targeted advertisement. In one embodiment, the targeted advertisement is a replacement for the primary network advertisement that is typically shown during a television program or between two television programs. In another embodiment the targeted advertisement does not replace an existing advertisement shown during a program, but simply fills time periods of program inactivity. One benefit of using the SDV environment to send targeted advertisements is that targeted advertisements are not required to be transmitted on the network in a continuous manner, and can be switched in based on an insertion decision made by the replacement detector 130. In this particular embodiment, advertisement server 180 provides advertisement replacement detector 130 with targeted advertisements particular to set-top box 110. These advertisements are then stored in storage 123.

As discussed above, each targeted advertisement stored in storage 123 will be associated with a particular cluster or set of clusters.

In one embodiment of the SDV system shown in FIG. 1, a subscriber uses the set-top box 110 to request a content stream to view on the television 150. The SDV server 170 receives the request for the content stream from the SDV subsystem 120 of the set-top box 110. When the content stream is available, SDV server 170 will bind a session to edge router 160 for delivery of the content stream. Edge router 160 then delivers the content stream, as MPEG-2 transport stream over QAM 161, to tuner 140 which will display the content stream on television 150.

Advertisement replacement detector 130 shown in FIG. 1 monitors the content streams that tuner 140 receives in order to detect an opportunity for advertisement replacement. In one embodiment, advertisement replacement detector 130 detects a trigger in the content stream that indicates that an advertisement transition will occur, where advertisement server 180 inserted the trigger into the content stream, and SDV server 170 forwarded the content stream with the trigger to set-top box 110 via edge router 160. In another embodiment, advertisement replacement detector 130 detects a splice point in the content stream that indicates that an advertisement transition will occur. Regardless of the technique to use to detect an advertisement period, when such an advertisement replacement opportunity occurs, advertisement replacement detector 130 accesses video camera 199 and obtains facial data for users currently watching television 150. Detector 130 maps the facial data to a cluster or set of clusters. Detector 130 will then access storage 123 to obtain the appropriate advertisements for the cluster or set of clusters. As discussed above, advertisements chosen from storage 123 will preferably have an association to a particular cluster or group of clusters. The advertisement is then sent to television 150.

Cluster Data Defined:

Clustering of facial data comprises measuring multiple attributes of a face (e.g, n attributes), and grouping the data in n-dimensional space. In one embodiment, the data can be grouped by partitioning it into several subsets (clusters), which number is usually unknown a priori, such that data in each cluster are more similar to each other than to data in other clusters, or such that data within each cluster shares some common characteristics.

Over time, each face image in a video stream is represented by taking a number of measurements (the measurements may be simple or complex). In one embodiment, vectors of these measurements ('feature vectors') are represented in a vector space ('feature space'). FIG. 2 illustrates this process. Although feature space 203 is illustrated in two dimensions, in practice the number of attributes measured on a face is frequently more than two, and may be very large. Attributes may comprise any measurements of facial data such as, but not limited to, intensities, colors, gradients, local binary patterns, wavelet coefficients, Haar coefficients, discrete cosine transform coefficients, color histograms, and projections onto eigenvectors.

In FIG. 2, P1, P2, P3 represent three different people. System 100 is not given identification information for the different people within the video. As shown in FIG. 2, video stream 201 is received by detector 130. Detector 130 then proceeds to detect faces 202 from the video stream. This basically comprises determining that faces exist within the video stream and preferably, determining the regions occupied by those faces in frames of the video stream, as the video progresses. (The video is preferably live video but may be prerecorded video). In this particular example, F1, . . . , F13 represent different facial images of P1, P2, and P3. Additionally, F1, F3, and F11 correspond to a first person P1; F2, F4, F5, F6, F7, F9, F13 correspond to P2, and F8, F10, F12 correspond to P3. However, detector 130 does not have access to this information. Detector 130 simply has access to facial images Fxx, and not people identifications Pyy, where xx represents any of the numbers 1 through 13 and yy represents any of the numbers 1 through 3.

Continuing the example, detected face images F1 through F12 in 202 are measured and mapped to feature vectors in feature space 203. For clarity, not all of the mappings of faces in 202 to points in feature space 203 are shown. As the video progresses, more and more data points are added to feature space 203 and clusters are formed, and may be re-formed. The results of clustering are illustrated in feature space 203. Clusters are groupings of data points in the feature space. In this example the clusters are C1, C2, C3, and C4. For example, it might be the case that most of P1's face images lie in C1; most of P2's face images lie in C2 and C4; and most of P3's face images lie in C3.

Many clustering methods are known. Some examples of clustering methods are partitional clustering methods such as k-means and mean-shift clustering; hierarchical clustering methods such as agglomerative single-link clustering; soft clustering methods such as fuzzy k-means and estimation of mixture models; and kernel-based clustering methods, which use only similarities or differences between pairs of representations of data.

The clustering method used in this embodiment, described below, employs a combination of simpler clustering methods. In one embodiment, the simpler clustering methods are different types of k-means clustering methods, where k represents the number of clusters.

Cluster Creation:

FIG. 3 is a flow chart showing those steps taken by set-top box 110 in creating clusters and associating the clusters with particular advertisements. The logic flow begins at step 301 where video from camera 199 is continuously received by detector 130. As discussed above, the video may comprise multiple faces of individuals participating in a viewing session (e.g., individuals currently watching TV 150). At step 303 faces are detected by detector 130 and represented as data in a feature space (step 305). In one embodiment of the present invention, a Viola-Jones face detection approach is used to extract facial features. This approach is described in detail by Paul Viola and Michael J. Jones in "Robust real-time face detection" International Journal of Computer Vision, Vol. 57, No. 2. (1 May 2004), pp. 137-154. In one embodiment, this procedure may also be used to detect eyes in a detected face area. Given locations of the detected eyes, the face's size may be normalized and the face image may be converted to a gray scale image. The detection of eyes is an optional step for the purpose of increasing accuracy: the face may be normalized directly from the output of the face detection if desired. Then local binary pattern (LBP) features are extracted for each face. Local binary pattern features are described in Timo Ahonen, Abdenour Hadid and Matti Pietikäinen, "Face recognition with local binary patterns,", European Conference on Computer Vision, 2004. Facial clustering then takes place at step 307. More particularly, at step 307 clustering techniques are applied to the data to identify clusters of data and detector 130 stores the clusters of data in storage 123.

Clusters may be created and stored after a predetermined amount of data has been obtained. The predetermined amount of data obtained may comprise, for example, data from a predetermined number of faces, a predetermined number of megabytes, a predetermined time (e.g., 10 seconds), or until a buffer is full. Detector 130 then performs batch k-means on the data to form k clusters. In one embodiment, an initial number of clusters k is decided and clusters are created using batch k-means.

In this embodiment, because k is not known a priori, k is estimated by varying the value of k, that is, by running the k-means algorithm for each value of k and selecting the value of k that optimizes a criterion. Many criteria are known in the art, for example, the average silhouette of the data (normalized difference between the average dissimilarities of data points to their own clusters and their average dissimilarities to points of the most similar clusters other than their own), described in detail in Peter J. Rousseeuw, "Silhouettes: a graphical aid to the interpretation and validation of cluster analysis," Journal of Computational and Applied Mathematics, Vol. 20, 1987, pp. 53-65. Examples of other criteria are the location of an elbow in a graph of the proportion of variance explained by the clusters, and the Bayesian Information Criterion (BIC).

Once clusters have been created, detector 130 associates the identified clusters with an action (e.g., the playing of advertisements) at step 309. There are multiple ways that advertisements can be associated with a particular identified cluster. For example, advertisements can be played for each cluster and a determination can be made as to which advertisements are watched and which advertisements are skipped for each cluster. This learned behavior can then be tailored such that a particular cluster is not provided advertisements that are not of interest. In one embodiment, the determination of whether an advertisement is watched is based on whether faces are detected during the playing of the advertisement.

By mapping such faces to clusters as will be described below in reference to FIG. 5, a determination may be made of which clusters are watching the advertisement. In another embodiment, the determination of whether an advertisement is skipped or watched is based on whether set-top box 110 receives a channel change signal or does not receive a channel change signal, respectively, during the playing of the advertisement.

Another technique for associating clusters with information is to determine programming watched by various clusters. For example, detector 130 may determine that clusters 2 & 4 watch Spongebob at 3-3:30 pm M-F, while clusters 1 & 3 watch the late news 10-11 pm M-Th. With knowledge of the programming preferences of different clusters, specific advertisements can be played for the various clusters at any time.

Another technique for associating advertisements to a particular cluster is to associate cluster characteristics (metrics) to known physical or social traits typically associated with the cluster characteristics. For example, using external knowledge about programming preferences of males and females, or adults and children, it may be inferred that a particular cluster represents a male user, a female user, an adult, a child, or certain combinations of these; e.g., an adult female. Different advertisements may be played based on a cluster or set of clusters present at a particular time, where the determination of which cluster or clusters present at a particular time may be made as described in reference to FIG. 5 below. Thus, advertisements can be associated with a cluster based on the metrics of the cluster.

Once detector 130 has associated clusters with an action, the associations are stored in storage 123 (step 311). This information can then be accessed at a later time to tailor advertisements to users of set-top box 110. This will be discussed below in FIG. 5.

Dynamic Updating of Clusters:

As discussed above, a continuous live feed of video enters set-top box 110. Cluster data is continuously updated throughout a viewing session. This data is used to dynamically modify the originally-created clusters. More particularly, as new faces are detected, they are assigned to an existing cluster if they are predicted well by that cluster, discarded if their membership in an existing cluster is ambiguous, or reserved in a buffer for spawning novel clusters later. In addition, spatio-temporal constraints are applied to the faces in the video to improve clustering accuracy. Faces assigned to an existing cluster may be used to modify the originally-created cluster.

In order to associate a face (i.e., facial data) to a cluster, classifiers are created for each existing cluster. The classifier can be a simple Gaussian classifier $p(x) \sim (x; m_i, \Sigma_i)$ where $m_i$ is mean and $\Sigma_i$ is covariance. A distance between two face features $f_a$ and $f_b$ can be computed as $d = \cos^{-1}(f_a (f_b)^T)$. A threshold distance is utilized in order to determine if data belongs to a particular cluster. If the probability of a face belonging to a cluster is larger than $t_1$, the face is classified to the existing cluster. If the face is not classified to the existing cluster but has large spatial overlap area with a face in the previous frame and the previous face has an associated cluster, the face will be assigned the same cluster as the previous face. This is a spatio-temporal smoothness constraint. After the face is assigned to the existing cluster, the cluster mean and covariance will be updated.

Another probability threshold ($t_2$) can be utilized, where $t_1 > t_2$. If the probability of a face belonging to a cluster is less than $t_2$ for every cluster, the face is classified to a new cluster. It will be saved in a buffer for future batch clustering to generate a new cluster. When the buffer is full, batch k-means clustering will be performed on the contents of the buffer and the set of newly generated clusters will be appended to the set of existing clusters.

If a face is neither assigned to a cluster nor placed in the buffer, it is discarded and will not be used, to prevent some faces that are ambiguous from wrongly being assigned to existing clusters, in order to prevent mis-assignments and also to prevent cluster mixing.

If two or more faces in one frame share the same cluster, all of those faces will be discarded because one person's face rarely appears at multiple locations in one frame. This is a spatio-temporal exclusion constraint.

FIG. 4 is a flow chart illustrating the dynamic updating of clusters during a viewing session as described above. The logic flow in FIG. 4 assumes that detector 130 has already created clusters from video data of people watching TV 150, and at a later time a subsequently received video of people watching TV 150 is received. These participants of a viewing session will be used to update existing clusters, or to create new clusters. Clusters will then be dynamically altered by detector 130 as shown in FIG. 4.

The logic flow begins at step 401 where during a viewing session a video feed is received by detector 130 of participants of the viewing session. Facial data is then detected by detector 130 (step 403). At step 405, a determination is made by detector 130 as to whether or not the facial data belongs to a previously-identified cluster. If so, the logic flow continues to step 407 where detector 130 adds the data to the previously-identified cluster, and the previously-identified cluster mean and variance are adjusted based on the added data.

If the facial data does not belong to a previously-identified cluster, the logic flow continues to step 409 where it is determined by detector 130 whether the data does not belong to any previously-identified cluster. If the data does not belong to any previously-identified cluster, a new cluster or set of clusters are created by detector 130 at step 411. Note that the creation of the new cluster or set of clusters may occur at a later time, since, as described above, the facial data is stored in a buffer and clustering of the data in the buffer is performed when the buffer has reached a predetermined capacity. Step 415 is reached when ambiguity occurs in the data. More particularly, step 415 is reached when a face neither can nor cannot be positively associated with a previously-identified cluster. When that happens, detector 130 discards the data.

Applying Targeted Advertisements to Users

As described above, FIG. 3 showed those steps taken by set-top box 110 in creating clusters and associating certain information (e.g., advertisements) to the clusters. FIG. 4 illustrated that the clusters can be dynamically updated over time. In FIG. 5 we now show those steps taken by set-top box 110 when targeting advertisements to users of set-top box 110. The logic flow of FIG. 5 occurs when clusters have been identified/created and are stored in storage 123, and a video feed is received at a later time. As discussed above, the pre-identified clusters are formed by applying clustering techniques to previously-obtained data to produce clusters of data.

The logic flow begins at step 501 where detector 130 receives a video feed at the later time (i.e., after clusters have already been identified/created). Detector 130 then detects a face or faces from the video feed (step 503). Faces are then represented as discussed above (step 505). Once faces are detected and represented in a feature space by detector 130, detector 130 accesses storage 123 and obtains information on previously-detected/created clusters (FIG. 3) and makes a determination as to which previously-identified clusters the currently-detected faces belong (step 507). This information is used to determine what action (e.g., what advertisements to play) to perform for users of set-top box 110 (step 509). More particularly, detector 130 can access storage 123 to determine advertisements associated with each cluster. Appropriate advertisements can then be output. In other words, the action associated with the determined cluster or clusters is performed.

Figure 5:
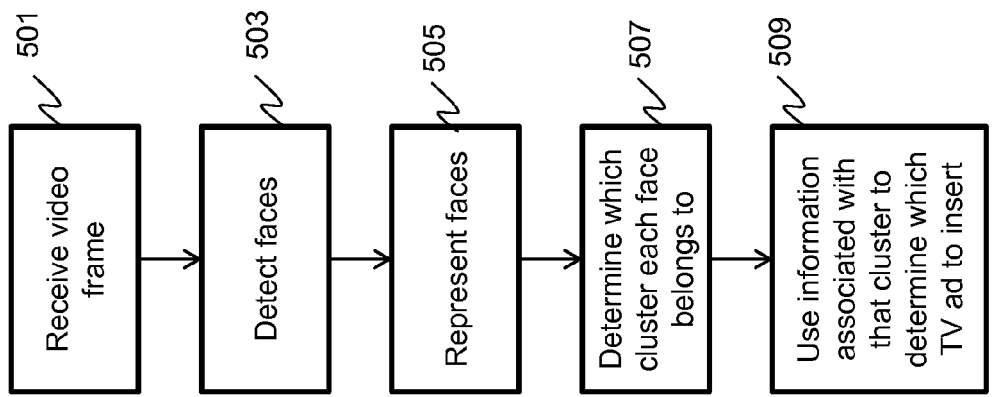
FIG. 5 shows steps taken by the set-top box when targeting advertisements to certain users of the set-top box.

The above-described steps of FIG. 5 provide for providing targeted advertisements to a user accomplished through receiving a video feed, detecting faces within the video feed, representing the faces as data, accessing a database of pre-identified clusters of data to determine what pre-identified clusters the detected faces belong to, and accessing a database to determine targeted advertisements to play based on what pre-identified clusters the detected faces belong to.

In a variation on the above-described embodiment, the determination of what advertisements to play for users of set-top box 110 can be made using the clusters to which faces detected in multiple frames belong. For one example, steps 501-507 can be repeated for consecutive or non-consecutive frames over a time interval (e.g, every $10^{th}$ frame for 5 minutes), and the sets of clusters determined in 507 for each frame combined to form a larger set of clusters. This larger set of clusters can then be used to determine what advertisements to play. For another embodiment, instead of combining every cluster produced in step 507 for each frame in this example, only a subset of the most frequently appearing clusters may be selected.

Although the above-described clustering technique was applied to a targeted-advertisement scenario, in other embodiments the above technique can be used in other scenarios where facial recognition is needed. For example, in scenarios where a camera continuously provides video to a processor, clusters may be utilized to:

- allow certain clusters access to a room, and prohibit other clusters from accessing a room;
- allow certain clusters access to equipment (e.g., an automobile), and prohibit other clusters from accessing the equipment;
- customize interfaces or experiences to specific clusters;
- take specific actions for specific clusters, for example, issue an alert, warning, or reminder.

In the foregoing specification, specific embodiments have been described. However, one of ordinary skill in the art appreciates that various modifications and changes can be made without departing from the scope of the invention as set forth in the claims below. For example, while the above-described embodiments had set-top box 110 performing most processing, it should be noted that the processing can take place anywhere in system 100, and may be distributed. Accordingly, the specification and figures are to be regarded in an illustrative rather than a restrictive sense, and all such modifications are intended to be included within the scope of present teachings.

Those skilled in the art will further recognize that references to specific implementation embodiments such as "detector" or "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for associating an action with facial data obtained from a video feed, the method comprising the steps of:
   receiving the video feed;
   detecting faces of users within the video feed;
   representing each detected face as data comprising one or more attributes for each face;
   representing the data in an n-dimensional vector space, wherein an n-dimensional vector space has one or more dimensions;
   performing a clustering method to group the data to form a set of clusters within the n-dimensional vector space, wherein there exists one cluster per user and one user per cluster, multiple clusters per user, or multiple users per single cluster within the n-dimensional vector space;
   after formation of the set of clusters, performing the steps of:
   detecting an additional face of a user;
   representing the additionally-detected face as additional data comprising one or more attributes;
   representing the additional data in an n-dimensional vector space;
   determining whether the additional face is associated with at least one of the clusters in the set of clusters in the n-dimensional vector space and if associated with at least one of the clusters in the set of clusters, modifying the associated cluster, otherwise determining whether the additional face is not associated with any of the clusters in the set of clusters, and if not associated with any of the clusters in the set of clusters, inserting the additional data into a buffer; and
   associating an action to a cluster in the set of clusters in the n-dimensional vector space.

2. The method of claim 1 additionally comprising:
   determining whether the additional face is ambiguously associated with a cluster in the set of clusters.

3. The method of claim 2 further comprising the step of:
   discarding the additional data.

4. The method of claim 1 wherein determining whether the additional face is associated with at least one of the clusters in the set of clusters in the n-dimensional vector space comprises:
   determining whether the additional face has a spatial overlap with a detected face in a previous frame of the video feed, where the detected face in a previous frame is associated with a cluster in the set of clusters.

5. The method of claim 1 additionally comprising:
   determining whether two faces are associated with the same cluster in the set of clusters; and
   discarding the two faces.

6. The method of claim 1 additionally comprising:
   creating a classifier for a cluster in the set of clusters; and
   classifying the additional face.

7. The method of claim 1 additionally comprising:
   determining whether a buffer is full of data; and
   adding a cluster to the set of clusters when the buffer is full.

8. The method of claim 1 additionally comprising:
   determining whether a buffer contains at least a predetermined number of faces, a buffer Is using at least a predetermined amount of memory, or a predetermined amount of video from the video feed has been processed; and
   adding a cluster to the set of clusters.

9. The method of claim 1 wherein the step of associating the action comprises the step of associating a playing of an advertisement based on a cluster in the set of clusters in the n-dimensional vector space.

10. The method of claim 1 further comprising the step of:
applying a k-means algorithm for at least one value of k and selecting a value of k based on a normalized difference between average dissimilarities of data points to their own clusters and their average dissimilarities to points of a most similar cluster other than their own.

11. The method of claim 1 further comprising the step of:
accessing a database to determine targeted advertisements to play based on a cluster in the set of clusters in the n-dimensional vector space.

12. An apparatus comprising:
a detector, wherein the detector is configured for receiving the video feed, detecting faces of users within the video feed, representing each detected face as data comprising one or more attributes for each face, representing the data in an n-dimensional vector space, wherein an n-dimensional vector space has one or more dimensions, performing a clustering method to group the data to form a set of clusters within the n-dimensional vector space, after formation of the set of clusters, performing the steps of detecting an additional face of a user, representing the additionally-detected face as additional data comprising one or more attributes representing the additional data in an n-dimensional vector space, determining whether the additional face is associated with at least one of the clusters in the set of clusters in the n-dimensional vector space and if associated with at least one of the clusters in the set of clusters, modifying the associated cluster, otherwise determining whether the additional face is not associated with any of the clusters in the set of clusters, and associating an action to a cluster in the set of clusters in the n-dimensional vector space,
wherein there exists one cluster per user and one user per cluster, multiple clusters per user, or multiple faces in a single cluster within the n-dimensional feature space; and
a buffer for storing the additional data when the additional data is not associated with any of the clusters in the set of clusters.

13. The apparatus of claim 12 wherein the action comprises a playing of an advertisement to be played with the identified clusters.

14. The apparatus of claim 12 wherein the advertisements are associated with the identified clusters by determining programs watched for various clusters.

15. The apparatus of claim 12 wherein the advertisements are associated with the identified clusters by determining what advertisements are skipped for each cluster.

16. The apparatus of claim 12 wherein the advertisements are associated with the identified clusters by determining known physical or social traits typically associated with the cluster characteristics.

17. The apparatus of claim 16 wherein the detector accumulates faces that do not belong to a cluster into the storage, and later creates additional clusters from the faces in the storage.

* * * * *